United States Patent Office 3,375,028
Patented Mar. 26, 1968

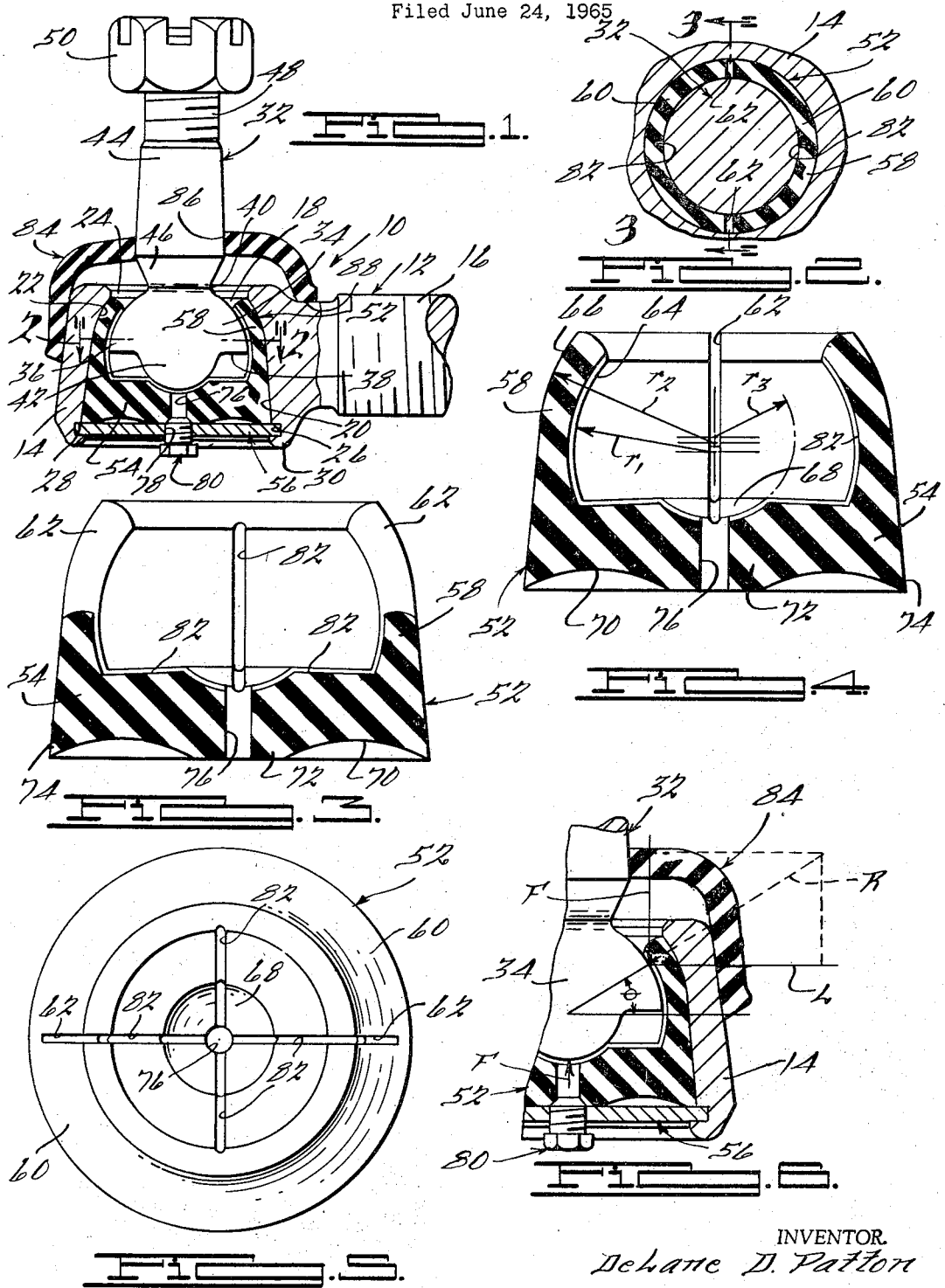

3,375,028
BALL JOINT FOR TIE ROD OR THE LIKE
De Lane D. Patton, Worthington, Ohio, assignor to Columbus Auto Parts Company, Columbus, Ohio, a corporation of Ohio
Filed June 24, 1965, Ser. No. 466,771
13 Claims. (Cl. 287—90)

ABSTRACT OF THE DISCLOSURE

A flexible joint construction comprising a housing section having an open end cavity defining a frusto-conical shaped side wall; a stud member extending through the opening in the housing section and having a head section located within the cavity, the head section comprising first and second hemi-spherical portions; a seat member disposed within the cavity and having a lower section having a central hemi-spherical recess complementary to and adapted to receive one of the portions of the head section, the seat member also comprising an upwardly extending wall section interposed between the head section of the stud member and the side wall of the housing section; the side wall including a pair of radially spaced spherical surface portions defined by radial lines having their centers located at axially spaced positions within said cavity, the seat member being formed with a plurality of grooves for retaining lubricant adjacent the head section of the stud member.

---

The purpose of the above abstract is to provide a non-legal technical statement of the disclosure of the contents of the instant patent application and thus serve as a searching-scanning tool for scientists, engineers and researchers. Accordingly, this abstract is not intended to be used in understanding or otherwise comprehending the principles of the present invention hereinafter described in detail, nor is it intended to be used in interpreting or in any way limiting the scope or fair meaning of the claims appended hereto.

This invention relates generally to flexible joints, and particularly, to improvements in flexible ball joints of the type used in automotive vehicle steering linkages and the like.

It is a general object of the present invention to provide a new and improved ball joint construction of the above type which is characterized by a positive adjustment or taken-up feature to accommodate for wear after extended operational use thereof.

It is a more particular object of the present invention to provide a new and improved ball joint construction of the above character which includes a headed stud member that is movably supported within an associated socket member by means of a spherical wedge shaped bearing member that is adapted to support the stud member for universal angular and rotative movement while concurrently absorbing or damping the impact or thrust of axial loads imparted to the stud member.

It is another object of the present invention to provide a new and improved ball joint construction of the above character which is designed so as to receive applied steering loads and impact forces in a manner such that the reaction forces to said loads increase the load withstanding capability of the joint construction.

It is still another object of the present invention to provide a new and improved ball joint construction of the above character wherein resistance to axial movement of the stud member increases in proportion to the thrust or impact of the steering loads applied thereto.

It is another object of the present invention to provide a new and improved ball joint construction which exhibits improved vibration damping and shock absorbing characteristics.

It is yet another object of the present invention to provide a new and improved ball joint construction of an extremely simple design which is easy to assemble and economical to commercially produce.

The foregoing and other objects and advantages of the present invention are achieved through the provision of a novel ball joint construction which includes a headed stud member and an associated socket member adapted to movably support the head portion of the stud member in a manner such that limited angular and rotative movement is provided between automotive vehicle tie rods and the associated support means therefor. The head portion of the stud member is supported within a central cavity of the housing by means of a spherical wedge-shaped bearing or seat member that is constructed of a somewhat resilient and self-lubricating material so as to absorb or dampen any road vibrations imparted to the stud member and to minimize any friction forces created upon movement of the stud member relative to the housing. In accordance with the principles of the present invention, the aforesaid bearing or seat member is of a configuration such that the stud member becomes more tightly secured within the housing as the steering or impact loads applied to the stud member increase, thereby minimizing the excess movement of these members relative to one another and the transfer of road vibrations and the like from the stud member to the socket member, consequently minimizing driver fatigue and, more importantly, attrition or excess wear of the various component members of the joint construction. The configuration of the bearing or seat member is also designed such that the seat member will be preloaded upon initial assembly thereof and will thus provide for wear "take-up" after extended operational use of the joint.

Other features and advantages of the present invention will be apparent from the following detailed description taken in conjunction with the accompanying drawing, wherein:

FIGURE 1 is a side elevational view, partially broken away, of an exemplary embodiment of the ball joint construction of the invention;

FIGURE 2 is a fragmentary cross-sectional view taken along the line 2—2 of FIGURE 1;

FIGURE 3 is an enlarged cross-sectional view of the seat or bearing member incorporated in the ball joint construction illustrated in FIGURE 1, as taken substantially along the lie 3—3 of FIGURE 2;

FIGURE 4 is a longitudinal cross-sectional view similar to FIGURE 3 of the bearing or seat member incorporated in the joint construction of the present invention;

FIGURE 5 is a top elevational view of the bearing or seat members illustrated in FIGURES 3 and 4; and FIGURE 6 is an enlarged fragmentary view of a portion of the structure illustrated in FIGURE 1.

Referring now to FIGURE 1 of the drawing, a flexible or ball joint construction 10, in accordance with an exemplary embodiment of the present invention, is shown as comprising a socket member 12 that includes a housing section 14 and a mounting section 16, the latter of which is externally threaded and is adapted to be secured to one end of an automotive vehicle tie rod member or the like (not shown).

As best seen in FIGURE 1, the housing section 14 of the socket member 12 defines a central annular cavity 18, having a side wall that is generally frusto-conical in shape at its lower end, herein designated 20, and which converges at its upper end 22 to define a reduced diameter opening 24. In a preferred construction of the present invention, the opening 24 is slightly oval or oblate shaped, i.e., the dimension of the opening 24 shown in the cross section of FIGURE 1 is somewhat larger than the dimension of the opening 24 as seen along a plane perpendicular to the plane of the cross section in FIGURE 1, whereby the opposing side edges of the opening 24 overlie a portion of the stud member to be later described and thereby resist extreme axial loads applied to the stud member. As initially formed, the lower end of the housing 14 is normally open and is formed with an annular groove or recess 26 which defines an annular shoulder 28, the portion of the housing section 14 circumjacent the recess 26 being reduced in thickness, as seen at 30 in FIGURE 1, and adapted to be peened or crimped radially inwardly to retain the various component members of the joint construction 10 within the cavity 18, as will later be described.

The joint construction 10 is adapted to be operatively connected to the transversely extending center or crosslink member (not shown) of an automotive vehicle steering linkage or the like by means of an elongated cylindrical stud member, generally designated by the numeral 32. The lower end of the stud member 32 is formed with a head section 34 which comprises a hemispherical medial portion 36 that terminates at its lower end in a radially inwardly extending shoulder 38 and at its upper end in a necked down or reduced diameter portion 40 which, upon assembly of the stud member 32 within the cavity 18, is axially aligned with the opening 24 formed at the upper end of the housing section 14. The head section 34 also includes a downwardly projecting hemispherical portion 42 which is somewhat smaller in diameter than the portion 36 and is centrally oriented relative to the shoulder 38. The stud member 32 comprises upper and lower tapered sections 44 and 46, the latter of which extends upwardly from the necked down portion 40 and the former of which terminates at its upper end in an externally threaded end portion 48 that is adapted to receive a suitable nut 50 for securing the stud member 32 and hence the joint construction 10 to the aforementioned cross link member of an automotive vehicle steering linkage or the like.

The head section 34 of the stud member 32 is retained and movably supported within the cavity 18 of the housing section 14 by means of a generally cup-shaped bearing or seat member, generally designated by the numeral 52, which is preferably constructed of a synthetic rubber material such as a self-lubricating urethane or an equivalent shock and vibration absorbing or damping material that has a durometer rating of approximately 50 Shore D. As best seen in FIGURES 1, 3 and 4, the seat member 52 comprises a lower bearing or support section 54 which is interposed between the lower hemispherical portion 42 of the stud member 32 and an annular closure plate 56 which closes the lower end of the cavity 18 and is secured to the housing section 14 between the shoulder 28 and housing portion 30, as will later be described. The seat member 52 also comprises an upwardly extending side wall section 58 which extends upwardly from and is integrally formed on the top of the support section 54, the side wall section 58 being interposed between the side wall of the cavity 18 and the outer periphery of the head section 34 of the stud member 32, as best seen in FIGURE 1. The side wall section 58 comprises a pair of diametrically opposed, semi-circular portions, generally designated 60, which define a pair of diametrically opposed, axially extending slots or slits 62 therebetween. The slits 62 permit the semi-circular portions 60 to deform slightly to accommodate for dimensional irregularities in the size of the cavity 18 resulting from production variations in the manufacture of the socket member 12.

Generally speaking, the exterior conformation of the seat member 52 is complementary to and is adapted to continuously engage the inner periphery of the cavity 18, and the inner periphery of the side wall section 58 is complementary to and adapted to peripherally engage the head section 34 of the stud member 32, whereby the stud member 32 will be supported within the housing portion 14 for universal angular and rotative movement relative to the socket member 12. More particularly, the outer periphery of the lower end of the seat member 52, or that portion of the outer surface of the bearing section 54 thereof, is frusto-conical in shape and is adapted to contiguously engage the frusto-conical surface portion 20 of the cavity 18. As best seen in FIGURE 4, the side wall section 58 of the seat member 52 is formed with radially inner and outer surface portions 64 and 66 which are defined by spherical radii $r_1$ and $r_2$ that have their respective centers vertically spaced along the central axis of the cavity 18, the center of the radius $r_1$ being somewhat below the center of the radius $r_2$. The top of the lower bearing section 54 of the seat member 52 is formed with a central semispherical recess 68 that is also defined by a spherical radius $r_3$ which has its center located on the central axis of the cavity 18 slightly above the center of the radius $r_2$. The lower side of the support section 54 of the seat member 52 is formed with a ring-shaped annular recess 70 that defines a central portion 72 and an outer peripheral portion 74 at the bottom of the seat member 52. A central axially extending bore 76 is formed in the seat member 52 between the lower side of the recess 68 and the central portion 72 of the seat member 52, the bore 76 registering or being aligned with a central opening 78 in the closure member 56 and being adapted to communicate lubricant from the opening 78 to the periphery of the head section 34 of the stud member 32. As seen in FIGURE 1, the opening 78 is normally closed by a suitable lubricant fitting or plug 80.

A plurality of (4) equally circumferentially spaced lubricant retaining grooves, generally designated by the numeral 82, are formed on the top of the lower or bearing section 54 of the seat member 52, the radially inner ends of the grooves 82 intersecting in the semispherical recess 68 at the central bore 76. Two of the grooves 82 are radially aligned with the slits 62 in the side wall section 58 and extend upwardly along the side wall section 58 and terminate a there upper ends at the lower ends of the slots 62. The other two grooves 82 extend upwardly along the entire inner surface of the side wall portion 58 and terminate at the top of the seat member 52. Upon assembly of the joint construction 10, as will hereinafter be described, the plurality of grooves 82 may be filled or "packed" with a suitable lubricant, which grooves 82 will thereafter function to retain or distribute the lubricant adjacent the outer periphery of the head section 34 to provide for relatively frictionless movement of the stud member 32 relative to the seat member 52.

It will be seen from the above described construction of the seat member 52 that the portions 60 of the side wall section 58 increase in thickness toward the top of the seat member 52 such that the portions 60 are, in effect, spherically wedge-shaped. With this construction, the resultant force R in FIGURE 6, which is transmitted from the stud member 32 to the seat member 52 at an angle $\theta$ from the line of the action of the steering load L, is concentrated at the maximum angle from the line of force of the steering load L, thereby providing the maximum force component F for maintaining the head section 34 of the stud member 32 in tight engagement with the support section 54 of the seat member 52. Accordingly, the force retaining the stud member 32 within the seat member 52 increases as the applied steering load L increases. It may be noted that if the spherical wedge design hereinabove described is not used, the portion of the side wall section 58 of the seat member 52 which is utilized to secure the head section 34 within the seat member 52 would shift toward the top of the seat member 52, whereby the angle at which the resultant force R is transmitted to the stud member 32 would be smaller, resulting in a smaller reaction force component F maintaining the head section 34 of the stud member 32 within the socket member 12.

The upper end of the housing section 14 is covered by an annular cup-shaped dust shield, generally designated 84, which is adapted to prevent moisture, road dirt and the like from entering into the cavity 18 through the opening 24 of the housing section 14. The dust shield 84 defines a central opening 86 which is in peripheral engagement with the section 44 of the stud member 32. The shield 84 is cut away as seen at 88 in FIGURE 1 to accommodate for the mounting section 16 of the socket member 12. Preferably, the shield 84 is constructed of a resilient and deformable material such as synthetic rubber or the like to provide for angular movement of the stud member 32 relative to the socket member 12.

Assembly of the joint construction 10 is accomplished by initially interposing the head section 34 of the stud member 32 between the portions 60 of the side wall section 58. The upper end of the stud member is then inserted through the cavity 18 until the head section 34 thereof, along with the seat member 52, is disposed within the cavity 18, at which time the annular closure plate 56 may be inserted into the lower open end of the cavity 18 and tightly secured against the shoulder 28 by peening or crimping the portion 30 of the housing section 14 over the outer peripheral edge thereof. Such an operation may be easily performed on a suitable "metal spinning" apparatus of the type well known in the metal forming art.

In a preferred construction of the present invention, there is preferably an interference fit between the upper end of the side wall section 58 of the seat member 52 and the confronting surfaces of the stud portion 36 and surface portion 22 of the housing section 14, such that upon assembly of the joint 10 a predetermined amount of the section 58 is compressed. This compressed portion serves the two-fold purpose of providing for wear "take-up" after extended use of the joint construction 10, and to counteract the tendency of the urethane material comprising the seat member 52 from flowing out of the cavity 18 between the top of the housing section 14 and the outer periphery of the stud member 32. The dimension of the spherical radius $r_3$ is also selected such that an interference fit is provided between the semispherical recess 68 of the seat member 52 and the portion 42 of the stud member 32, whereby to assure that the portion 36 of the stud member 32 "wedges" the upper ends of the side wall portions 58 against the surface portion 22 of the cavity 18. It will be noted that upon assembly of the seat member 52 within the cavity 18, the portions 72 and 74 formed at the lower end of the seat member 52 are compressed by the upper surface of the closure plate 56, thus forcing the seat member 52 upwardly within the cavity 18 to further accommodate for wear "take-up," as hereinabove described.

It will be seen from the foregoing that the present invention provides a new and improved ball joint construction which, by virtue of a novel means of movably but firmly supporting the stud member 32, i.e., the seat member 52, will have a long and effective operational life. Moreover, it will be seen that the ball joint construction 10 of the present invention is of an extremely simple design, is easy to assemble and therefore will be economical to commercially manufacture.

While it will be apparent that the exemplary embodiment illustrated herein is well calculated to fulfill the objects stated, it will be appreciated that the present invention is susceptible to modification, variation and change without departing from the proper scope or fair meaning of the subjoined claims.

What is claimed is:
1. In a flexible joint construction,
a housing section defining a cavity having a frusto-conical shaped side wall portion and an opening at one end,
a stud member extending through said opening and having a head section located within said cavity,
said head section comprising first and second semispherical portions, and a radially extending shoulder portion, and
a seat member disposed within said cavity and having integral first and second support sections for supporting said portions of said head section within said cavity, said seat member further comprising a radially extending portion adapted to engage said shoulder portion of said head section,
said first support section being interposed between one of said semispherical portions and said side wall and the other of said sections being interposed between the other of said semispherical portions and the lower end of said cavity.

2. The invention as set forth in claim 1 wherein said seat member is constructed of a resilient and deformable material.

3. The invention as set forth in claim 1 wherein one of said support sections of said seat member increases in thickness toward one end of said housing section.

4. The invention as set forth in claim 1 wherein said first section of said seat member is wedge-shaped in transverse section.

5. In a flexible joint construction,
a housing section defining a cavity having a frusto-conical shaped side wall portion and an opening at one end,
a stud member extending through said opening and having a head section located within said cavity, said head section defining first and second semispherical portions and a radially extending shoulder portion,
a seat member comprising a lower semi-spherical portion for supporting said stud member for axial movement and a radially extending shoulder adapted to engage and support said shoulder portion of said head section,
said seat member defining a plurality of lubricant grooves adjacent said head section of said stud member.

6. The invention as set forth in claim 5 wherein said seat member is wedge-shaped in transverse section.

7. In a flexible joint construction,
a housing section having an open end cavity defining a frusto-conical shaped side wall,
a stud member extending through the opening in said housing section and having a head section located within said cavity,
said head section comprising first and second semispherical portions and a radially extending shoulder portion, and
a seat member disposed within said cavity and comprising a lower section having a central semispherical recess complementary to and adapted to receive one of said portions of said head section,
said seat member also comprising a radially extending shoulder engageable with said shoulder portion and an upwardly extending wall section interposed between said head section of said stud member and said side wall,
said wall section including first and second radially spaced spherical surface portions,
said surface portions and said spherical recess lying in separate spherical planes having their centers located at axially spaced positions within said cavity.

8. The invention as set forth in claim 7 wherein prior to assembly of the joint the radial plane within which the outermost surface portion of said wall section lies is spaced radially further from the axis of the joint than the radius of the adjacent portion of said cavity, whereby to provide an interference fit between said side wall and said wall section.

9. In a joint construction, a housing section having a cavity defining a lower frusto-conical side wall portion and an upper converging wall portion, a stud member having a head section located within said cavity, said head section comprising a first semispherical portion located adjacent said converging portion and a second semi-spherical portion extending downwardly within said cavity, said first and second semispherical portions defining a radially extending shoulder therebetween, and a seat member disposed within said cavity for movably supporting said head section relative to said housing section, a seat member disposed within said cavity for movably supporting said head section relative to said housing section, said seat member including a side wall portion interposed between said head section and said side wall of said cavity and a lower section having a radially extending portion and a semispherical recessed portion adapted to engage said shoulder and one of said semi-spherical portions of said head section, said side wall portion varying in thickness toward the upper end of said housing section whereby to provide an interference fit between said semispherical portion of said head section and said side wall of said cavity.

10. In a ball joint construction, a socket member including a housing section having a central cavity, said cavity having an open end and a side wall defined by a frusto-conical surface portion and a converging surface portion, a stud member extending through said opening and having a head section located within said cavity, said head section comprising first and second semispherical portions which define a radially outwardly extending shoulder therebetween, and a seat member constructed of a resilient and deformable material for movably supporting said stud member within said housing section, said seat member comprising a lower support section having a central semispherical recess lying in a first spherical plane and adapted to receive one of said semispherical portions of said stud member, said seat member also comprising an upwardly extending side wall section, said side wall section being interposed between one of said semispherical portions of said head section and said side wall of said cavtiy and having radially inner and outer surfaces lying in second and third sperical planes, said plane defining the radially outer surface of said side wall sections prior to assembly of the joint being spaced radially further from the axis of the joint than the portion of said cavity adjacent said side wall sections, whereby to provide an interference fit between said head section of said stud member and said side wall of said cavity, said first plane defining said semispherical recess in said support section of said seat member prior to assembly of the joint being spaced closer to the center of the joint than said one semispherical portion of said stud member which said recess is adapted to receive, whereby to provide an interference fit between said seat member and the said one portion of said stud member.

11. The invention as set forth in claim 8 wherein the radially inner surface of said side sections of said seat member are formed with a plurality of grooves for retaining lubricant adjacent said head section of said stud member.

12. The invention as set forth in claim 8 wherein one end of said cavity is closed by a closure plate having means for communicating lubricant to said cavity.

13. The invention as set forth in claim 8 wherein said seat member is constructed of urethane having a durometer rating of approximately 50 Shore D.

References Cited

UNITED STATES PATENTS

| 1,908,789 | 5/1933 | Ragan | 287—90 |
| 2,461,866 | 2/1949 | Alldredge | 287—90 |
| 2,999,710 | 9/1961 | Latzen | 287—90 |
| 3,063,744 | 12/1965 | Herbenar | 287—87 |

FOREIGN PATENTS

| 1,014,441 | 8/1957 | Germany. |
| 837,108 | 6/1960 | Great Britain. |

CARL W. TOMLIN, *Primary Examiner.*

ANDREW KUNDRAT, *Assistant Examiner.*

UNITED STATES PATENT OFFICE
CERTIFICATE OF CORRECTION

Patent No. 3,375,028                       March 26, 1968

De Lane D. Patton

It is certified that error appears in the above identified patent and that said Letters Patent are hereby corrected as shown below:

Column 1, line 42, "joints, and particularly," should read -- joints and, more particularly, --. Column 2, line 50, "lie" should read -- line --. Column 3, line 6, "opposing" should read -- opposite --. Column 4, line 42, "a there" should read -- at their --; line 42, "slots" should read -- slits --. Column 8, line 38, "3,063,744" should read -- 3,266,142 --; after line 38, insert -- 3,063,744   11/1962   Flumerfelt-------287-87 --.

Signed and sealed this 9th day of September 1969.

(SEAL)
Attest:

Edward M. Fletcher, Jr.                 WILLIAM E. SCHUYLER, JR.
Attesting Officer                        Commissioner of Patents